(12) United States Patent
Parameshwaran et al.

(10) Patent No.: US 11,366,894 B1
(45) Date of Patent: Jun. 21, 2022

(54) SECURE COMPUTING RESOURCE DEPLOYMENT USING HOMOMORPHIC ENCRYPTION

(71) Applicant: INTERNATIONAL BUSINESS MACHINES CORPORATION, Armonk, NY (US)

(72) Inventors: Pradeep Parameshwaran, Boeblingen (DE); Rushir Patel, Cary, NY (US); Shikhar Kwatra, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 17/114,558

(22) Filed: Dec. 8, 2020

(51) Int. Cl.
*G06F 21/53* (2013.01)
*G06F 21/60* (2013.01)
*H04L 9/00* (2022.01)
*G06F 21/62* (2013.01)
*G06F 21/72* (2013.01)

(52) U.S. Cl.
CPC ............ *G06F 21/53* (2013.01); *G06F 21/602* (2013.01); *G06F 21/6209* (2013.01); *G06F 21/72* (2013.01); *H04L 9/008* (2013.01)

(58) Field of Classification Search
CPC .... G06F 21/53; G06F 21/602; G06F 21/6209; G06F 21/72; H04L 9/008
See application file for complete search history.

(56) References Cited

U.S. PATENT DOCUMENTS

| | | | |
|---|---|---|---|
| 9,699,213 | B2 | 7/2017 | Nagaratnam et al. |
| 10,778,445 | B1* | 9/2020 | Feng .................... G06F 16/2379 |
| 2012/0266170 | A1* | 10/2012 | Zimmerman ....... G06F 9/45558 |
| | | | 718/1 |
| 2020/0089917 | A1 | 3/2020 | Skourtis et al. |
| 2020/0153855 | A1 | 5/2020 | Kirti et al. |

(Continued)

FOREIGN PATENT DOCUMENTS

| | | |
|---|---|---|
| CN | 105426227 A | 3/2016 |
| CN | 110084063 A | 8/2019 |

OTHER PUBLICATIONS

Nassar et al., "Secure Outsourcing of Matrix Operations as a Service", 2013 IEEE 6th International Conference on Cloud Computing, Dec. 31, 2013 (8 pages) (Year: 2013).

(Continued)

*Primary Examiner* — Ayoub Alata
(74) *Attorney, Agent, or Firm* — Tihon Poltavets, Esq.; Kevin P. Radigan, Esq.; Heslin Rothenberg Farley & Mesiti P.C.

(57) ABSTRACT

Secure computing resource deployment within a computing environment is facilitated by receiving a request to deploy a computing resource in the computing environment, and obtaining a homomorphically-encrypted data set. The homomorphically-encrypted data set includes configuration-related data for a desired configuration of the computing resource to be deployed in the computing environment. The process further includes using the homomorphically-encrypted data set in configuring for deployment the computing resource, where the computing resource is configured for deployment with the desired configuration without decrypting the homomorphically-encrypted data set.

17 Claims, 8 Drawing Sheets

(56) References Cited

U.S. PATENT DOCUMENTS

2020/0244437 A1    7/2020   Ruan
2020/0311300 A1   10/2020   Callcut et al.

OTHER PUBLICATIONS

International Search Report (ISR) & Written Opinion for PCT Application No. PCT/CN2021/124596, dated Jan. 20, 2022 (9 pages) (Year: 2022).

Mel et al., "The NIST Definition of Cloud Computing," National Institute of Standards and Technology, Information Technology Laboratory, Special Publication 800-145, Sep. 2011 (pp. 1-7).

Gai et al., "Blockchain-Enabled Reengineering of Cloud Datacenters," IEEE Cloud Computing 5, No. 6 (2018): 21-25.

Gahi et al., "On the User of Homomorphic Encryption to Secure Applications, Services, and Routing Protocols", European Journal of Scientific Research, vol. 88, No. 3, Oct. 2012 (pp. 416-438).

Hecht, Asaf, "Shadow Admins—The Stealthy Accounts that You Should Fear the Most", CyberArk®: Threat Research Blog, https://www.cyberark.com/resources/threat-research-blog/shadow-admins-the-stealthy-accounts-that-you-should-fear-the-most, published Online Jun. 8, 2017 (6 pages).

Red Hat®, "Packaging Applications and Services with Kubernetes Operators", downloaded at: https://developers.redhat.com/topics/operators/, Oct. 30, 2020 (7 pages).

\* cited by examiner

SECURE COMPUTING RESOURCE DEPLOYMENT USING HOMOMORPHIC ENCRYPTION

BACKGROUND

Cloud computing refers to a group of network elements providing services on demand, such as data storage and computing power, without directed active management by a consumer, or user. Cloud computing relies on a sharing of resources to achieve coherence and economies of scale.

Cloud computing can be provided as a service over the Internet, such as in the form of "Infrastructure as a Service" (IaaS), "Platform as a Service" (PaaS), and/or "Software as a Service" (SaaS). A Platform as a Service (PaaS) provider allows a consumer to deploy onto the PaaS cloud infrastructure consumer resources created using program language, libraries, services and tools supported by the PaaS provider. The consumer does not manage or control the underlying cloud infrastructure, including the networks, servers, operating systems, or storage, but has control over the deployed applications. Platform as a Service (PaaS) providers offer a computing platform, typically including an operating system, programming language execution environment, database, and web server, and the consumer, or user, develops and runs software on the cloud platform, rather than obtaining and maintaining the underlying hardware and software layers.

SUMMARY

Certain shortcomings of the prior art are overcome and additional advantages are provided through the provision, in one or more aspects, of a computer program product to facilitate secure computing resource deployment. The computer program product includes a computer-readable storage medium having program instructions embodied therewith. The program instructions are readable by one or more processors to cause the one or more processors to receive a request to deploy a computing resource in a computing environment, and to obtain a homomorphically-encrypted data set. The homomorphically-encrypted data set includes configuration-related data for a desired configuration of the computing resource to be deployed in the computing environment. The program instructions further cause the one or more processors to use the homomorphically-encrypted data set in configuring for deployment the computing resource, where the computing resource is configured for deployment with the desired configuration without decrypting the homomorphically-encrypted data set.

Computer systems and computer-implemented methods relating to one or more aspects are also described and claimed herein. Further, services relating to one or more aspects are also described and may be claimed herein.

Additional features are realized through the techniques described herein. Other embodiments and aspects are described in detail herein, and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Figure 1:
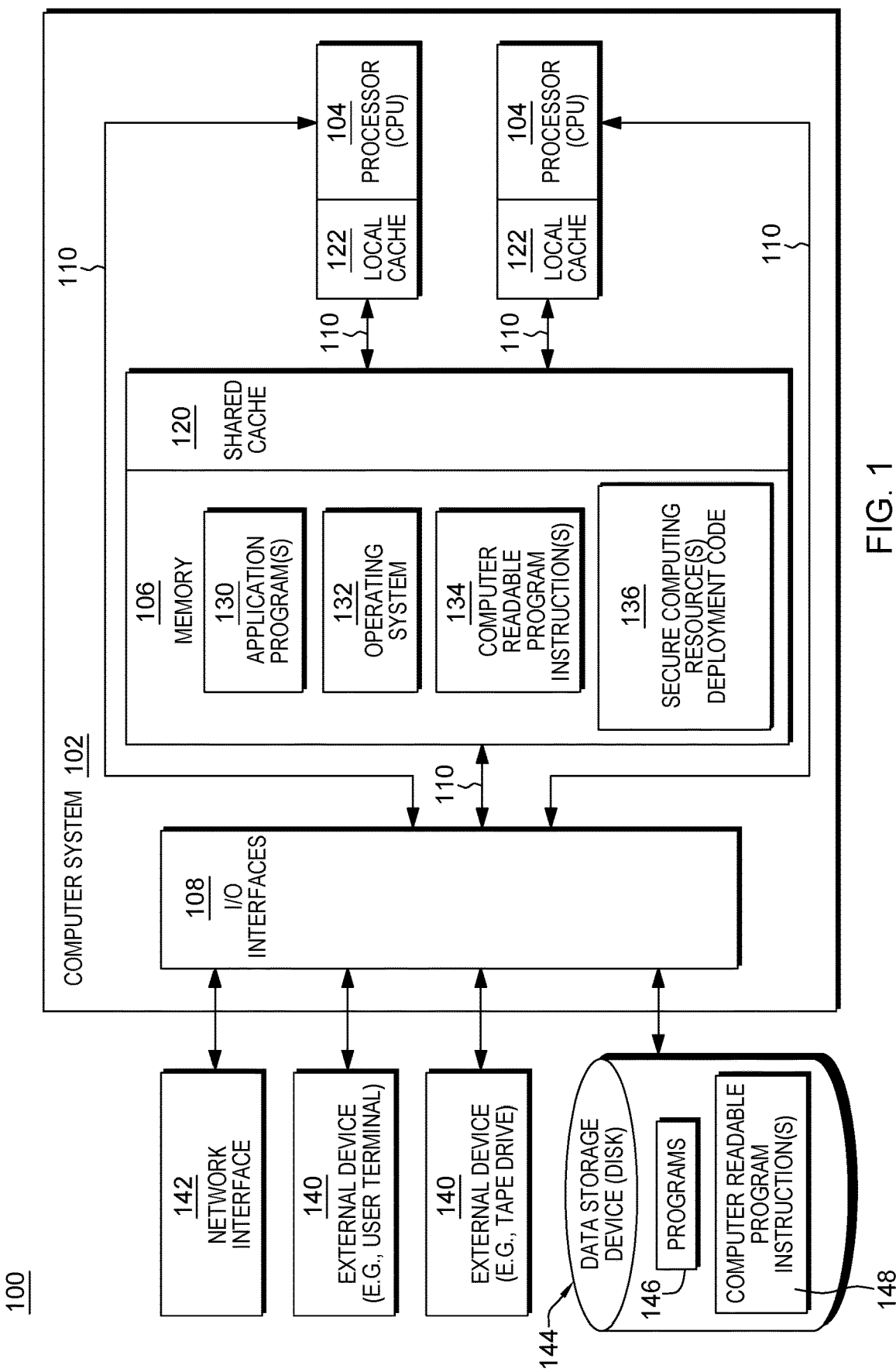
FIG. 1 depicts a block diagram of one embodiment of a data processing system which can implement processing in accordance with one or more aspects of the present invention.

The accompanying figures, in which like reference numerals refer to identical or functionally similar elements throughout the separate views, and which are incorporated in and form a part of the specification, further illustrate the present invention and, together with the detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 1 as computer-readable program instructions 134, as well as application programs 130 and code for secure computing resource deployment 136, one or more of which can be stored in memory 106 of computer system 102. Further examples include programs 146 and computer-readable program instruction(s) 148 in data storage device 144 of FIG. 1.

With reference to the figures, and in particular with reference to FIG. 1, an example diagram is shown of a data processing environment in which one or more aspects of illustrative embodiments can be implemented. FIG. 1 is only an example and is not intended to assert or imply any limitation with regard to the environments in which different embodiments can be implemented. A particular implementation can make many modifications to the depicted environment based on the following description.

With reference to FIG. 1, as noted this figure depicts a block diagram of a data processing system in which one or more aspects of the present invention can be implemented. Data processing system 100 is an example of a computer, such as server, or other type of device, in which computer usable program code or instructions implementing one or more processes may be located for the illustrative embodiments.

As shown in FIG. 1, data processing system 100 includes, for instance, a computer system 102 shown, e.g., in the form of a general-purpose computing device. Computer system 102 can include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Processor 104 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 can include, for instance, a cache 120, such as a shared cache, which may be coupled to local caches 122 of processors 104. Further, memory 106 can include one or more programs or applications 130, an operating system 132, and one or more computer readable program instructions 134, as well as program code for secure computing resource deployment 136, for instance, to facilitate secure deploying of a virtual machine (VM) and/or a container within a secure enclave of a host computing environment, as discussed herein. Additionally, or alternatively, computer readable program instructions 134 can be configured to carry out one or more other functions of certain embodiments of the invention.

Computer system 102 can also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 can store one or more programs 146, one or more computer readable program instructions 148, and/or data, etc. The computer readable program instructions can be configured to carry out functions of one or more aspects of the present invention.

Computer system 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 can be operational with numerous other general purpose or special purpose computing system environments or configurations. Examples of well-known computing systems, environments, and/or configurations suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and cloud computing environments that include any of the above systems or devices, and the like.

As noted, the depicted example of FIG. 1 is not meant to imply architectural limitations. Further, as noted, data processing system 100 of FIG. 1 could be, for instance, a server, workstation, tablet computer, laptop computer, or other computing device.

As noted, cloud computing can be provided as a service over the Internet, such as a "Platform as a Service" (PaaS). In operation, a PaaS provider allows a user, or consumer, to deploy onto the cloud infrastructure a computing resource, such as a virtual machine, or a container, to run one or more user applications or workloads. In an information technology computing environment, an operator framework is typically provided that provides automation of configuration of, for instance, one or more computing resources to run the user workload, as well as the system underneath. Lifecycle management processing is typically part of the operator framework.

By way of specific example, an IBM® System/z computing system, offered by International Business Machines Corporation of Armonk, N.Y. (USA), can handle many complex workloads in a highly secure manner. Using, for instance, OpenShift® technology provided by Red Hat® of Raleigh, N.C. (USA), an IBM® System/z can provide dynamic deployment of workloads in a cloud-based model. In one or more implementations, the OpenShift® technology includes an OpenShift® container platform, which uses the CoreOS® operating system offered by Red Hat® under the covers. The CoreOS® system is considered immutable, and is an open source, lightweight operating system based on the Linux® kernel, and designed for providing infrastructure to clustered deployments, while focusing on automation, ease of application development, security, reliability, and scalability (where Linux® is a registered trademark of Linus Torvalds). Managing such a complex computing environment is a challenge, and requires strict control. For instance, making any change to a highly secured environment should always be monitored and should be made in a controlled manner. The OpenShift® technology provides the operator framework to make changes and/or automate setup in the OpenShift® cloud platform. Using operators based on the operator framework on a highly secure environment requires additional security measures, such as the cloud operator should not be able to tamper with configuration settings provided by the user or consumer. For instance, in one or more embodiments, one or more trusted entities can be provided to attest to configuration settings or changes being made. Further, the configuration process should be tamper-proof, so that the user has confidence that the user's computing resource (e.g., VM or container) is securely deployed for operation as desired.

Figure 2:
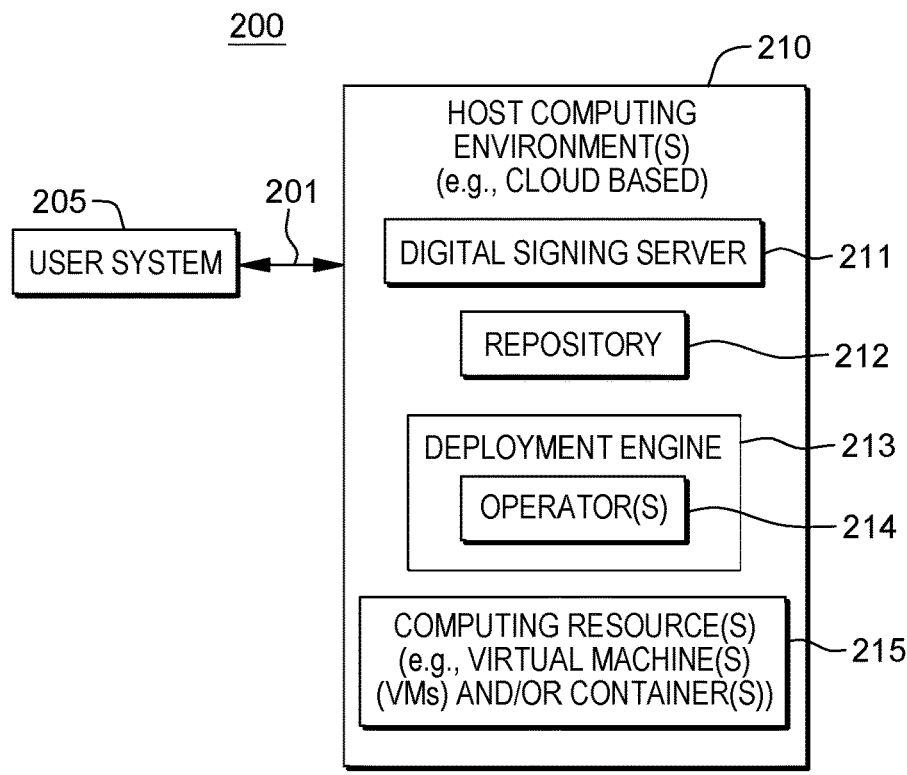
FIG. 2 depicts a computing environment to which various aspects of an embodiment of the present invention can be implemented, in accordance with one or more aspects of the present invention.

FIG. 2 illustrates one embodiment of a technological environment in which one or more aspects disclosed herein can be implemented. As illustrated, technological environment 200 includes one or more user systems 205 which operatively couple, via one or more networks 201, to a host computing environment, such as a cloud-based computing environment 210.

In one or more implementations, user system 205 is a user or consumer computer system or network that is operatively coupled to computing environment 210 by one or more networks 201. By way of example only, the one or more networks 201 can be, or include, one or more buses, or other links, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, such as the data described herein, as well as other data, depending on the implementation.

Host computing environment 210 includes, in one embodiment, one or more computing systems or processing environments, that can be distributed in a cloud-based environment. In the embodiment illustrated in FIG. 2, host computing environment(s) 210 includes, by way of example, a digital signing server 211 for integrity-checking encrypted data sets, a repository 212 for holding encrypted data sets, a deployment engine 213, including one or more operators 214 to facilitate configuring and deploying user computing resources 215 on host computing environment(s) 210. As noted, in one or more embodiments, computing resource(s) 215 can be one or more virtual machines and/or one or more containers, which are to be securely configured for running a user workload or application.

Generally stated, in one or more embodiments, a computer system, computer program product, and computer-implemented method are provided herein for homomorphically encrypting user configuration setting data, or files, at the user system, and securely transmitting the homomorphically-encrypted data set for operator processing at the host computing environment(s). The operator processing, such as cloud operator processing, in a cloud-based environment, is programmed to facilitate deploying the user's resource configuration without knowing content of the configuration data set via an automated framework. The automated framework uses one or more operators, which are (for instance) program code or containers that work on the homomorphically-encrypted data set to do the necessary data manipulations and analysis in an immutable environment, and to ensure integrity of the user's configuration data is maintained. In one embodiment, the deployment engine deploys one or more operators, which manage, for instance, a standard template of the configuration settings for the particular computing resource type to be deployed, and finds one or more respective user-defined settings in the homomorphically-encrypted data set received from the user system. The operator framework also implements an attestation process to integrity-check the obtained encrypted data set to ensure that the data set actually originated from the user system, and that integrity is maintained.

Figure 3:
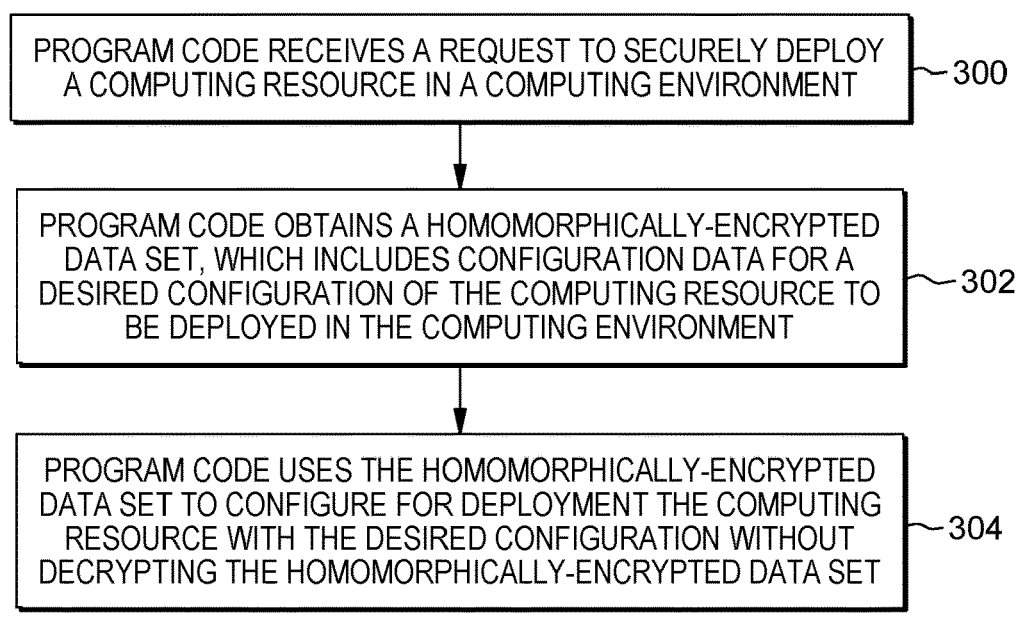
FIG. 3 depicts one embodiment of a process for facilitating secure computing resource deployment within a computing environment, in accordance with one or more aspects of the present invention.

FIG. 3 illustrates one embodiment of a process for facilitating secure computing resource deployment within a computing environment, in accordance with one or more aspects of the present invention. Embodiments of the process of FIG. 3 can include a computer-implemented method, a computer system, and a computer program product, where program code executing on one or more processors receives a request to securely deploy a computing resource in a computing environment 300, and obtains a homomorphically-encrypted data set, which includes configuration data for a desired configuration of the computing resource to be deployed in the computing environment 302. Embodiments of the present invention also include program code that uses the homomorphically-encrypted data set in configuring or defining for deployment the computing resource with the desired configuration without decrypting the homomorphically-encrypted data set prior to deployment 304.

In certain embodiments, using the homomorphically-encrypted data set includes identifying configuration settings homomorphically for use in configuring the computing resource for deployment, without decrypting the homomorphically-encrypted data set. In one or more embodiments, program code is provided for deploying the computing resource in a secure enclave of the computing environment using the homomorphically-identified configuration settings. In one or more embodiments, the computing resource is a virtual machine or a container to run a workload or application of the user.

In one or more embodiments of the present invention, program code is provided to define a settings template for the computing resource to be deployed, and obtained homomorphic encryption keys used to generate the received homomorphically-encrypted data set, as well as homomorphically encrypt the settings template using the obtained homomorphic encryption keys. In one embodiment, identifying configuration settings homomorphically includes comparing the homomorphically-encrypted settings template and the received homomorphically-encrypted data set to identify the configuration settings without decrypting the homomorphically-encrypted data set. Further, in one embodiment, defining the settings template can include obtaining one or more default configuration settings for the computing resource, and the replacing, based on identifying a respective configuration setting when comparing the homomorphically-encrypted settings template and the received homomorphically-encrypted data set, a default configuration settings of the one or more default configuration settings with the identified respective configuration setting.

In one or more embodiments of the present invention, program code is provided to invoke one or more deployment operators, based on receiving the request to deploy the computing resource. The one or more deployment operators obtain the homomorphically-encrypted data set from a repository. In one embodiment, the homomorphically-encrypted data set obtained from the repository is digitally signed to facilitate integrity-checking, and program code is provided to perform integrity-checking on the obtained homomorphically-encrypted data set. In one embodiment, the homomorphically-encrypted data set is digitally signed using a blockchain.

Embodiments of the present invention are inextricably tied to computing and provide significantly more than existing approaches to deploying computing resources within a computing environment. For instance, embodiments of the present invention provide program code executing on one or more processors that exploits the interconnectivity of various systems, as well as that utilizes various computing-centric data analysis and handling techniques, in order to obtain a desired configuration for a computing resource to be deployed on a computing environment without decrypting the encrypted data set. Both the interconnectivity of computing systems utilized and the computer-exclusive data processing techniques utilized by the program code, enable various aspects of the present invention. Further, embodiments of the present invention provide significantly more than existing approaches to deploying a computing resource within a computing environment by maintaining the configuration data set for the computing resource encrypted prior to deploying the computing resource.

In embodiments of the present invention, the program code provides significantly more functionality, including but not limited to: 1) program code that receives a request to deploy a computing resource in a computing environment; 2) program code that obtains a homomorphically-encrypted data set, the homomorphically-encrypted data set including configuration-related data for a desired configuration of the computing resource to be deployed in the computing environment; and 3) program code that uses the homomorphically-encrypted data set in configuring for deployment the computing resource, where the computing resource is configured for deployment with the desired configuration without decrypting the homomorphically-encrypted data set.

As noted, one or more embodiments described herein facilitate secure computing resource deployment using, in part, a homomorphically-encrypted data set. Homomorphic encryption is a type of encryption which allows for calculations to be performed on the encrypted data without first decrypting the data. The result of the computation is in an encrypted form, and when decrypted, the output is the same as if the operation had been performed on the unencrypted data. In particular, homomorphic encryption allows for operations to be performed on encrypted data without knowing the private key (i.e., without decryption). Homomorphic encryption includes multiple types of encryption approaches that can perform different classes of computations over encrypted data. These include partially-homomorphic, somewhat homomorphic, leveled-fully-homomorphic, and fully-homomorphic encryption. Fully-homomorphic encryption is a cryptosystem that supports arbitrary computation on cyphertext.

Figure 4:
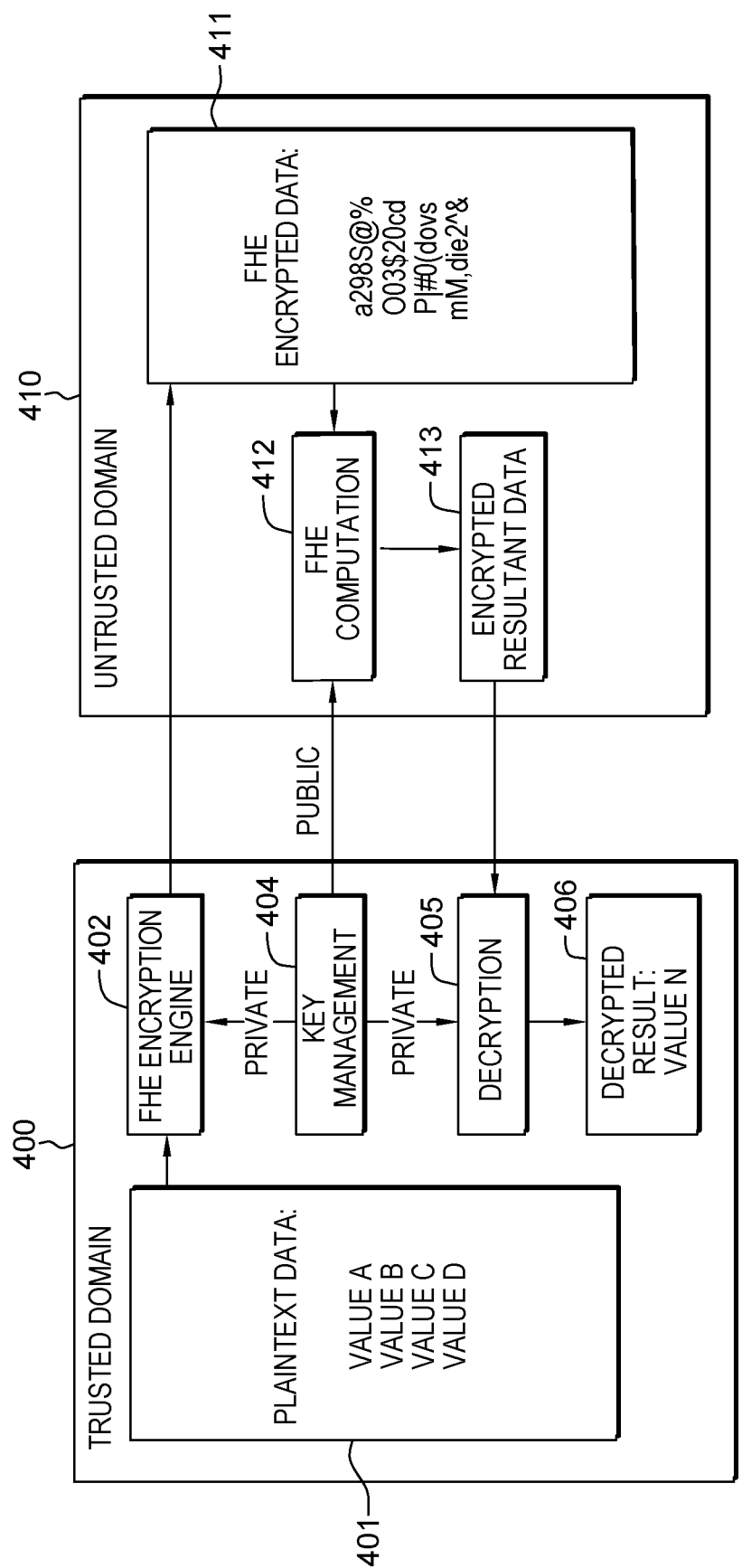
FIG. 4 depicts one embodiment of homomorphic encryption processing, which can be used in one or more embodiments of secure computing resource deployment processing, in accordance with one or more aspects of the present invention.

By way of example, FIG. 4 illustrates one embodiment of homomorphic encryption. In FIG. 4, a computing environment is illustrated where a trusted domain 400 outsources to an untrusted domain 410 one or more computations 412. As shown, original plaintext data 401, such as a set of numbers, is fully homomorphically-encrypted 402, such as by using lattice cryptography (which is quantum-resistant), to provide an encrypted data set 411 as cyphertext to untrusted domain 410. Untrusted domain 410 obtains the associated public key from a key management module or server 404 in trusted domain 400 to facilitate performing one or more fully-homomorphic encryption (FHE) computations 412. The computed result 413 of the operation in encrypted form is then returned to the trusted domain 400 for decryption 405 to obtain the unencrypted output 406. As noted, homomorphic encryption advantageously enables the processing of data without providing access to the data. This includes, in one embodiment, performing computations on the encrypted data itself, rather than requiring decryption of the data. Homomorphic encryption can be provided using any of a number of open-source, fully-homomorphic encryption (FHE) libraries which implement various generation FHE schemes to provide the desired encryption. For instance, a list of available homomorphic encryption implementations is maintained by the Homomorphicencryption.org Industry Standards Consortium.

Figure 5:
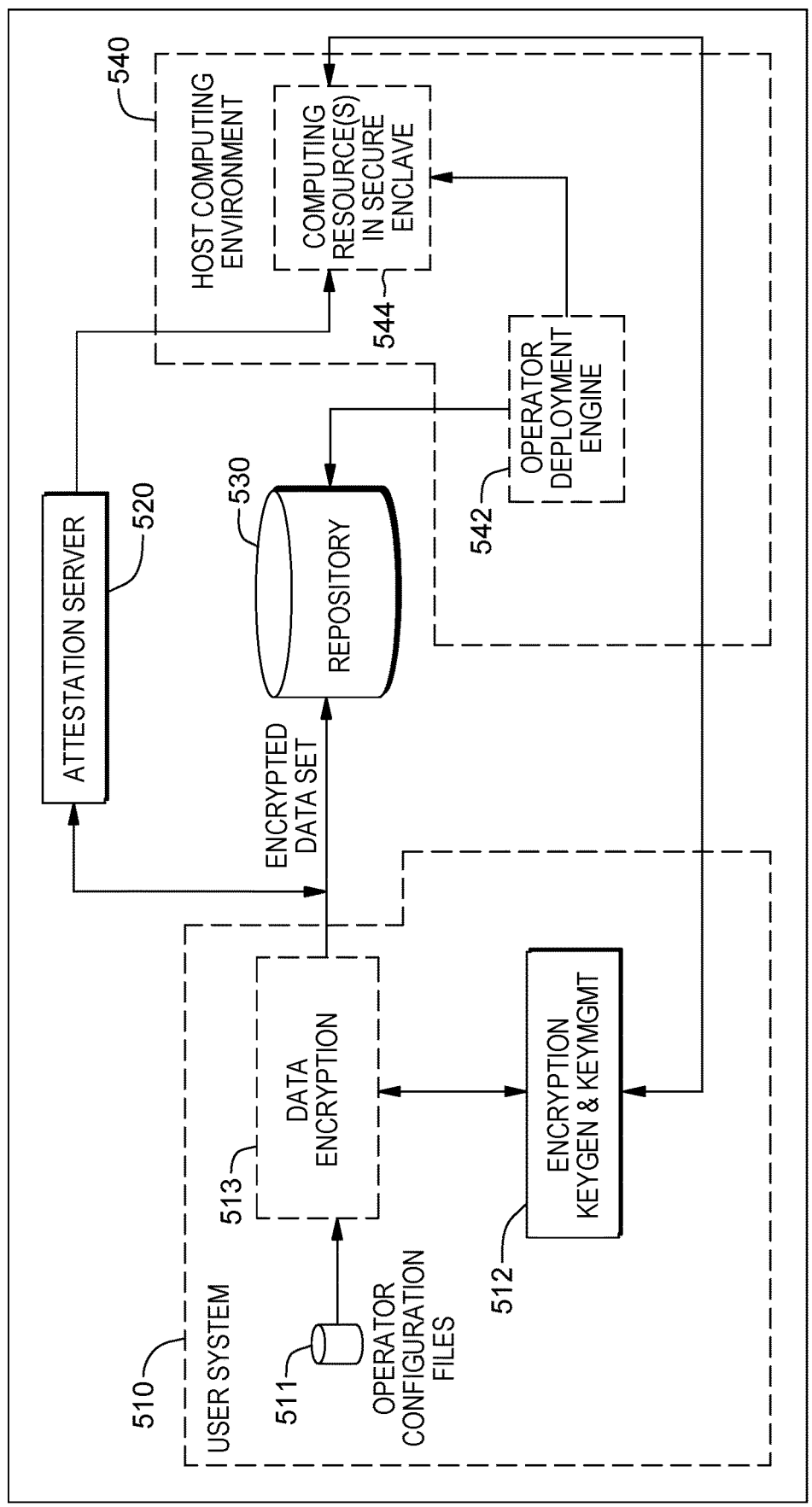
FIG. 5 depicts a computing environment and process flow implementing one or more aspects of an embodiment of the present invention.
Figure 6:
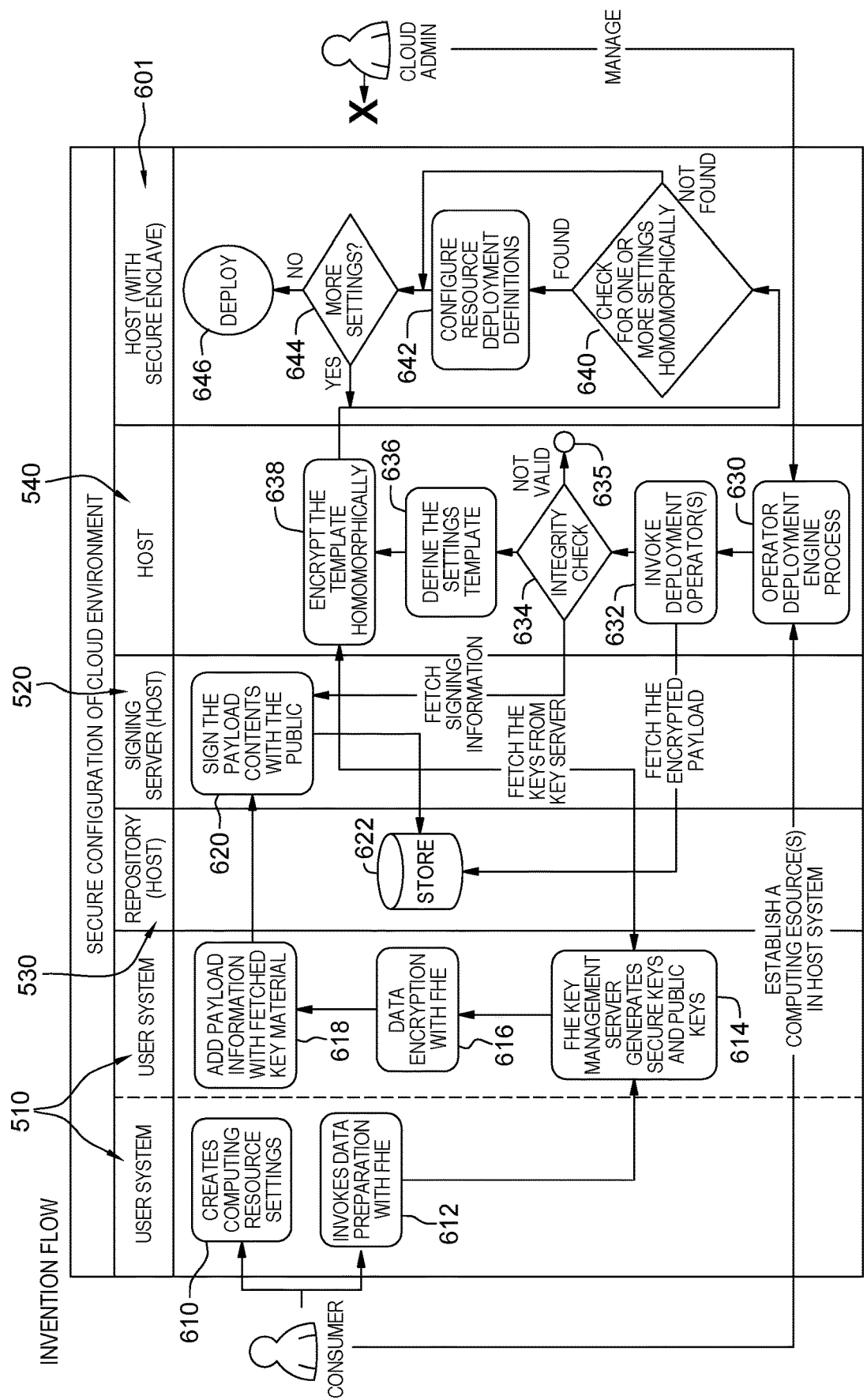
FIG. 6 depicts one process embodiment of secure computing resource deployment, in accordance with one or more aspects of the present invention.

FIGS. 5 & 6 depict one embodiment of a computing environment and process flow for secure computing resource deployment, in accordance with one or more aspects of the present invention.

Referring initially to FIG. 5, one embodiment of a technological environment 500 is illustrated, which includes one or more user systems 510, which can be one or more on-premise computer systems of a user or consumer, that operatively communicate with one or more third party computing environments including, for instance, a signing or attestation server system 520, a repository 530, and a host computing environment 540, such as a cloud computing environment, that is to securely deploy the user's desired computing resource. As noted, in one or more embodiments, the computing resource to be deployed is a virtual machine that is to confidentially run, for instance, a user workload or application. In one or more other embodiments, the computing resource(s) to be deployed includes one or more containers. As understood, a container in cloud computing is an approach to operating system virtualization. A single container can be used to run anything from a small microservice or software process to a larger application. Inside a container, all the necessary executables, binary codes, libraries, and configuration files, are provided.

Referring collectively to FIGS. 5 & 6, one embodiment of secure computing resource deployment process, in accordance with one or more aspects described herein, includes a consumer or user initiating creating computing resource settings 610 (FIG. 6), and in particular, operator configuration files 511 (FIG. 5). The user system then invokes preparation of an encrypted data set using, in one embodiment, fully-homomorphic encryption (FHE) 612. The encryption process uses one or more secret or private keys obtained via a key management module, process, server, etc., 512 (FIG. 5), which generates secure keys and public keys 614 (FIG. 6), in one embodiment. The generated secure key is used to encrypt the data using, for instance, fully-homomorphic encryption 616, resulting in homomorphically-encrypted data set or homomorphically-encrypted configuration file 513 (FIG. 5). As illustrated in FIG. 6, information for fetching the keys can be added to the payload 618, before forwarding the encrypted data set to a signing or attestation server 520 (which can be a host-based or cloud-based server), for signing the payload contents with the public key 620. In the embodiment illustrated, the signed homomorphically-encrypted data set can be stored 622 (FIG. 6) to a repository 530, which in one implementation is a host-based, or cloud-based, repository.

As illustrated in FIG. 6, the user system or consumer system decides to create a computing resource (e.g., virtual machine or container) in the host-based computing environment. As part of this, the user sends a request to the computing environment, and in particular to an operator deployment engine 542 (FIG. 5), which begins to process the user request 630 (FIG. 6). The deployment engine invokes one or more deployment operators 632 (FIG. 6) to, in part, fetch the encrypted data set or payload from repository 530. The operator(s) are one or more agents or utilities that assist with computing resource setup in the host-based computing environment, and can be, in one or more embodiments, a collection of containers. In the depicted implementation, an integrity check 634 (FIG. 6) is performed to ensure that the signed encrypted data set is still valid, and not tampered with. As part of the process, the applicable signing information is fetched from the signing server 520 to allow for the integrity check to occur. If not valid, the computing resource deployment process terminates 635 (FIG. 6). As noted, in one embodiment, the signed encrypted data can be implemented using a blockchain.

As illustrated in FIG. 6, a settings template for the configuration settings is defined 636 based on the desired computing resource (e.g., virtual machine and/or container). In one or more embodiments, defining the settings template can include providing a standard template for the resource type, and can include providing one or more default configuration setting values for the template. Once obtained, the settings template is homomorphically-encrypted 638 (FIG. 6) using the same homomorphic private key(s) as used to encrypt the user's configuration settings file(s). The homomorphic private key(s) can be obtained from the key management server associated with the user system 512 (FIG. 5). In one implementation, the resultant homomorphically-encrypted settings template includes all the standard configuration settings for the computing resource(s) to be configured and deployed. Essentially, the settings template includes a set of default settings, one or more of which can be substituted out based on comparison with the retrieved homomorphically-encrypted data set. In particular, in one implementation, the operator processing compares the two homomorphically-encrypted data sets, one from the user system, and the other host system-generated, to identify one or more user-desired configuration settings for the computing resource. This comparison occurs homomorphically, for instance, using an existing homomorphic comparison method, and when a configuration setting desired by the user is identified, the encrypted settings template is updated accordingly 642 (FIG. 6), with the processing repeating for one or more configuration settings in the settings template 644 (FIG. 6). In particular, the process repeats for each of the configuration settings or definitions that the user provided in the encrypted data set, and once the definitions for deployment are obtained, the computing resource is deployed.

As illustrated in FIG. 6, a host cloud administrator of the host computing environment is unable to access a decrypted version of the configuration settings during the secure computing resource deployment processing of FIG. 6. For instance, the administrator can manage deployment of the computing resource, but not know the configuration settings, which remain in encrypted format until the resource is deployed. In the embodiment of FIG. 6, the comparison of encrypted data sets homomorphically, and the configuring of deployment definitions, as well as the deploying of the computing resource 646 all occur within a secure enclave 601 of the host or cloud computing environment. This processing occurs using the homomorphically-encrypted data, without decrypting the data prior to deploying the computing resource.

Figure 7:
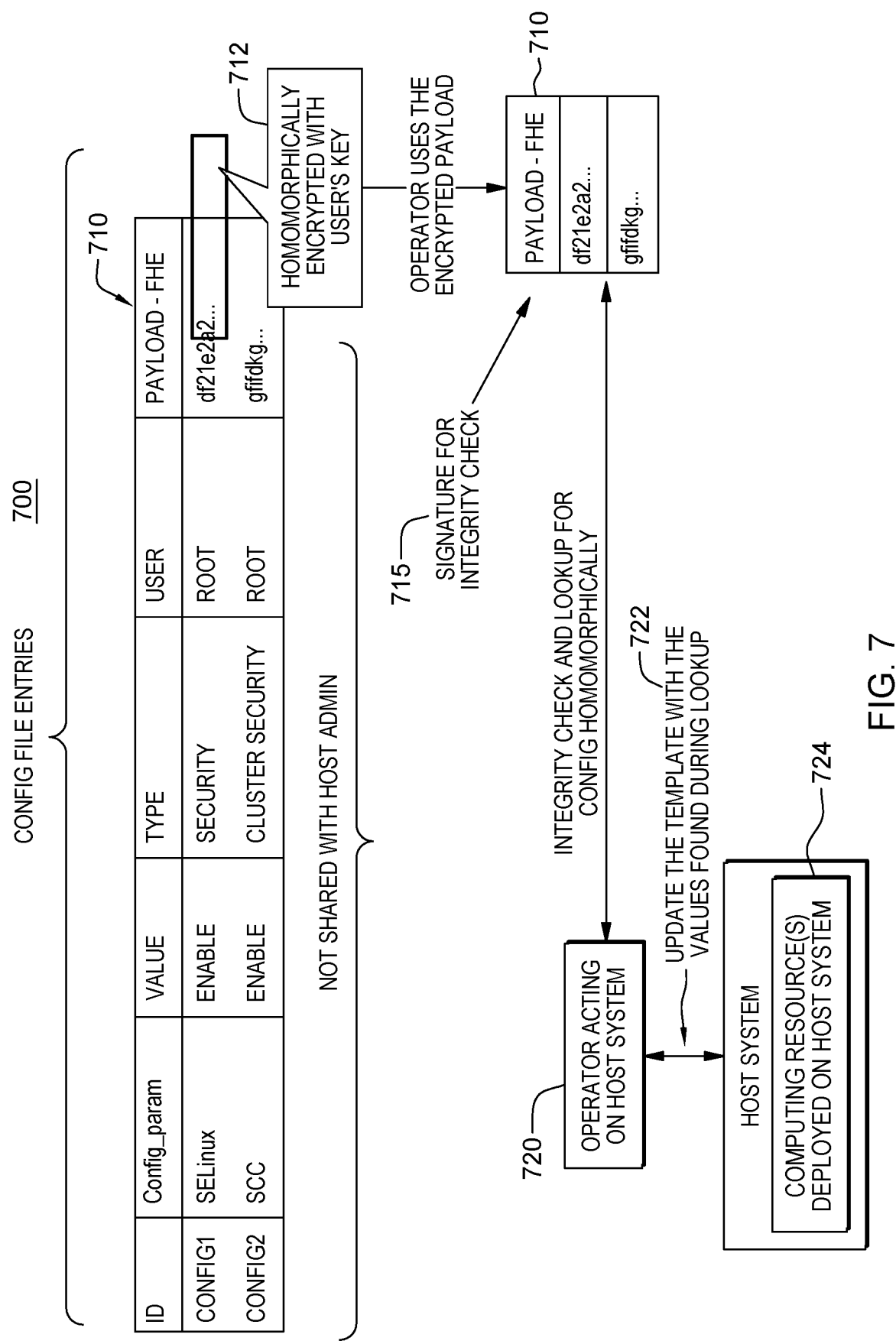
FIG. 7 depicts a sample configuration data set homomorphically-encrypted, and digitally signed, and used by a computing environment in configuring settings for computing resource deployment, in accordance with one or more aspects of the present invention.

By way of example, FIG. 7 illustrates one embodiment of configuration file entries 700 where, for instance, the config_parameter "SELinux" is enabled, with the resultant payload 710 shown homomorphically-encrypted with the user's secret key 712. Another configuration parameter "Security Context Constraints (SCC)" is also shown enabled in this example, and has a corresponding encrypted data set indicated for the payload. As noted, the processing disclosed herein works on the homomorphically-encrypted data set. In particular, the host deployment operator(s) issued by the deployment engine process use the encrypted payload 710, and initially obtain the public key from the signing server for integrity-checking of the encrypted data set. Assuming that the integrity check is valid, then processing ascertains the configuration data set homomorphically, with the operator acting on the host system (e.g., the cloud computing environment) to ascertain particular encrypted data set values, which are then used to update the settings template, that itself is also encrypted with the same secret key as discussed above 722. The host system then deploys the computing resource 724 using the resultant encrypted deployment definitions for the configuration settings, as described herein.

Those skilled in the art will note from the above description that provided herein are a computer program product, computer system, and computer-implemented method for configuring a security-sensitive computing environment using a process which includes encrypting content of a configuration file at a user system using, for instance, homomorphic encryption, and sending the encrypted configuration file as an operator package dataset (or blob), where a host system administrator, such as a cloud administrator, lacks access to the encrypted content. Attestation is performed to ensure that integrity of the encrypted data set is maintained, thereby preventing tampering of the content present in the package. Responsive to the deployed host system operators configuring the computing resource as desired, such as described herein, access to the encrypted content of the configuration file is revoked, for instance, based on an action tag. In one or more implementations, the process can further include recording an attestation pattern to reinforce integrity checking along a blockchain network for cross-validation of the process. In one or more embodiments, the processing described herein can be utilized in association with a Kubernetes framework implemented in the host computing environment.

Further exemplary embodiments of a computing environment to implement one or more aspects of the present invention are described below with reference to FIGS. 8-9.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 1. Computer system/server 102 of FIG. 1 can be practiced in distributed cloud computing environments where tasks are performed by remote processing devices that are linked through a communications network. In a distributed cloud computing environment, program modules may be located in both local and remote computer system storage media including memory storage devices. Computer system/server 102 is capable of being implemented and/or performing any of the functionality set forth hereinabove.

Figure 8:
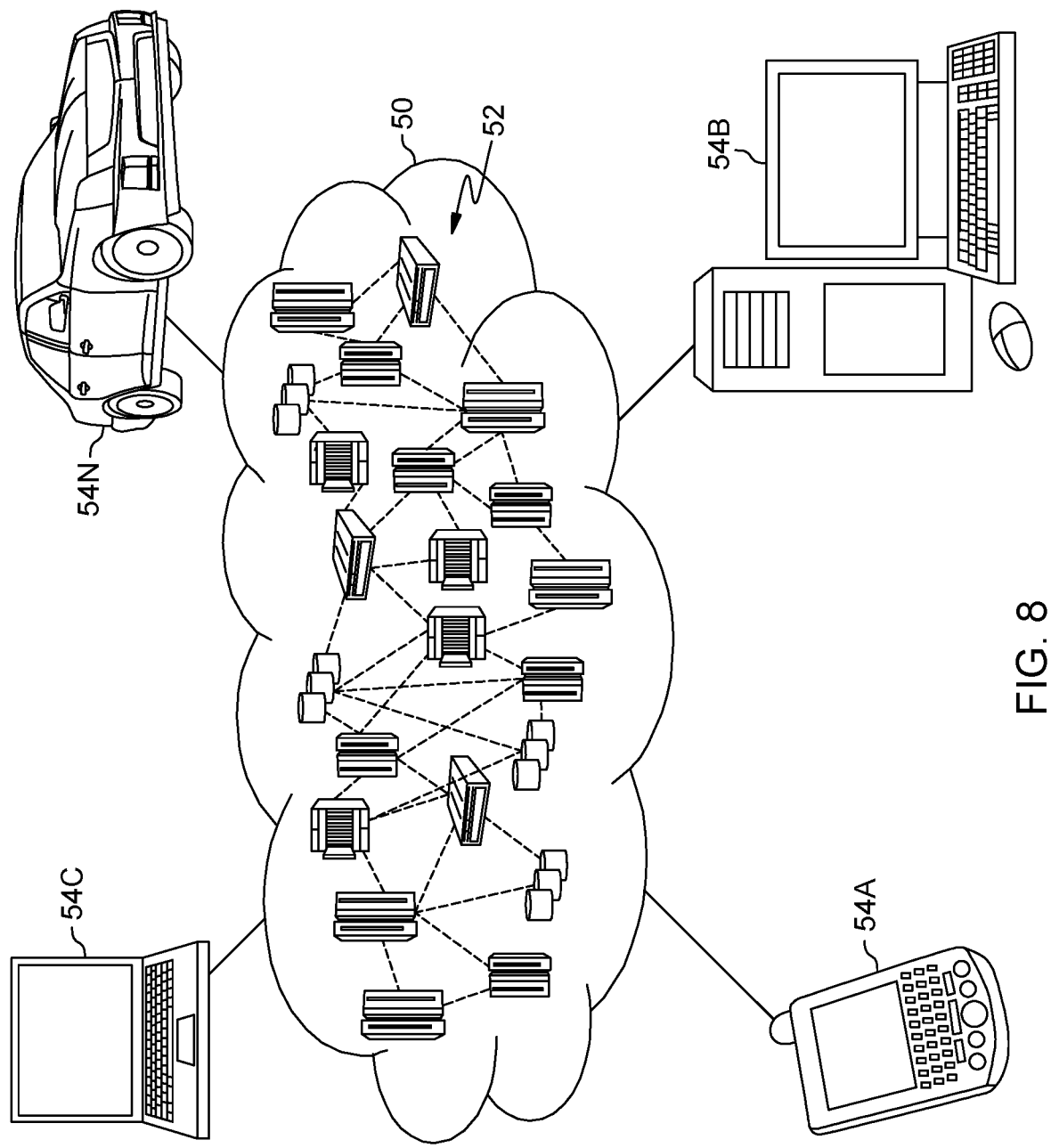
FIG. 8 depicts one embodiment of a cloud computing environment which can facilitate implementing, or be used in association with, certain aspects of an embodiment of the present invention.

Referring now to FIG. 8, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
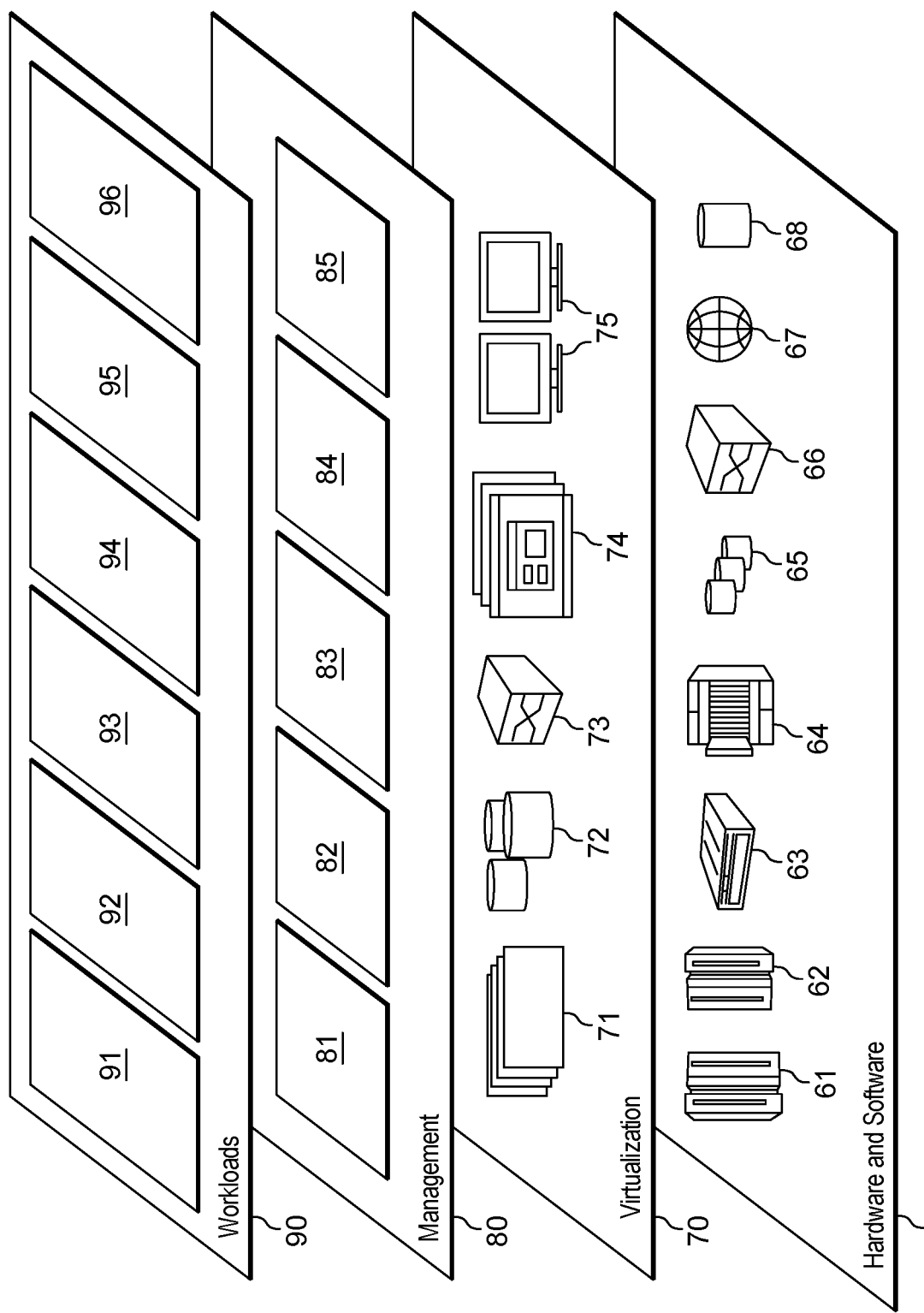
FIG. 9 depicts abstraction model layers according to an embodiment of the present invention.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure computing resource deployment processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer program product to facilitate secure computing resource deployment, the computer program product comprising:
   a computer-readable storage medium having program instructions embodied therewith, the program instructions being readable by one or more processors to cause the one or more processors to:
      receive a request to deploy a computing resource in a computing environment;
      obtain a homomorphically-encrypted data set, the homomorphically-encrypted data set including configuration-related data for a desired configuration of the computing resource to be deployed in the computing environment; and
      use the homomorphically-encrypted data set in configuring for deployment the computing resource, the computing resource being configured for deployment with the desired configuration without decrypting the homomorphically-encrypted data set, the using comprising:
         identifying configuration settings homomorphically encrypted for configuring the computing resource for deployment, without decrypting the homomorphically-encrypted data set, the identifying comprising comparing the obtained homomorphically-encrypted data set and a homomorphically-encrypted settings template to identify the configuration settings without decrypting the homomorphically-encrypted data set.

2. The computer program product of claim 1, wherein the program instructions further cause the one or more processors to deploy the computing resource in a secure enclave of the computing environment using the homomorphically-identified configuration settings.

3. The computer program product of claim 2, wherein the computing resource is selected from the group consisting of a virtual machine and a container.

4. The computer program product of claim 1, wherein the program instructions further cause the one or more processors to:
   define a settings template for the computing resource to be deployed;
   obtain homomorphic encryption keys used to generate the received homomorphically-encrypted data set;
   homomorphically encrypt the settings template using the obtained homomorphic encryption keys to generate the homomorphically-encrypted settings template for comparison with the obtained homomorphically-encrypted data set.

5. The computer program product of claim 4, wherein defining the setting template comprises obtaining one or more default configuration settings for the computing resource, and wherein the program instructions further cause the one or more processors to replace, based on identifying a respective configuration setting from comparing the homomorphically-encrypted settings template and the received homomorphically-encrypted data set, a default configuration setting of the one or more default configuration settings with the identified respective configuration setting.

6. The computer program product of claim 1, wherein the program instructions further cause the one or more processors to invoke one or more deployment operators based on receiving the request to deploy the computing resource, the one or more deployment operators obtaining the homomorphically-encrypted data set from a repository.

7. The computer program product of claim 6, wherein the homomorphically-encrypted data set obtained from the repository is digitally signed for integrity checking, and wherein the program instructions further cause the one or more processors to perform integrity checking on the obtained homomorphically-encrypted data set.

8. The computer program product of claim 7, wherein the homomorphically-encrypted data set is digitally signed using a blockchain.

9. A computer system for facilitating secure computing resource deployment, the computer system comprising:
   a memory;
   one or more processors operatively coupled to the memory; and
   program code executable by the one or more processors via the memory to perform a method comprising:
      receiving a request to deploy a computing resource in a computing environment;
      obtaining a homomorphically-encrypted data set, the homomorphically-encrypted data set including configuration-related data for a desired configuration of the computing resource to be deployed in the computing environment; and
      using the homomorphically-encrypted data set in configuring for deployment the computing resource, the computing resource being configured for deployment with the desired configuration without decrypting the homomorphically-encrypted data set, the using comprising:
         identifying configuration settings homomorphically encrypted for configuring the computing resource for deployment, without decrypting the homomorphically-encrypted data set, the identifying comprising comparing the obtained homomorphically-encrypted data set and a homomorphically-encrypted settings template to identify the configuration settings without decrypting the homomorphically-encrypted data set.

10. The computer system of claim 9, further comprising deploying the computing resource in a secure enclave of the computing environment using the homomorphically-identified configuration settings.

11. The computer system of claim 10, wherein the computing resource is selected from the group consisting of a virtual machine and a container.

12. The computer system of claim 9, further comprising:
   defining a settings template for the computing resource to be deployed;
   obtaining homomorphic encryption keys used to generate the received homomorphically-encrypted data set;
   homomorphically encrypting the settings template using the obtained homomorphic encryption keys to generate the homomorphically-encrypted settings template for comparison with the obtained homomorphically-encrypted data set.

13. The computer system of claim 9, further comprising invoking one or more deployment operators based on receiving the request to deploy the computing resource, the one or more deployment operators obtaining the homomorphically-encrypted data set from a repository.

14. The computer system of claim 13, wherein the homomorphically-encrypted data set obtained from the repository is digitally signed for integrity checking, and wherein the program code further cause the one or more processors to perform integrity checking on the obtained homomorphically-encrypted data set.

15. The computer system of claim 14, wherein the homomorphically-encrypted data set is digitally signed using a blockchain.

16. A computer-implemented method comprising:
  receiving a request to deploy a computing resource in a computing environment;
  obtaining a homomorphically-encrypted data set, the homomorphically-encrypted data set including configuration-related data for a desired configuration of the computing resource to be deployed in the computing environment; and
  using the homomorphically-encrypted data set in configuring for deployment the computing resource, the computing resource being configured for deployment with the desired configuration without decrypting the homomorphically-encrypted data set, the using comprising:
    identifying configuration settings homomorphically encrypted for configuring the computing resource for deployment, without decrypting the homomorphically-encrypted data set, the identifying comprising comparing the obtained homomorphically-encrypted data set and a homomorphically-encrypted settings template to identify the configuration settings without decrypting the homomorphically-encrypted data set.

17. The computer-implemented method of claim 16, further comprising:
  defining a settings template for the computing resource to be deployed;
  obtaining homomorphic encryption keys used to generate the received homomorphically-encrypted data set;
  homomorphically encrypting the settings template using the obtained homomorphic encryption keys to generate the homomorphically-encrypted settings template for comparison with the obtained homomorphically-encrypted data set.

* * * * *